US00RE44428E

(19) United States
(12) Reissued Patent
Spielberger

(10) Patent Number: US RE44,428 E
(45) Date of Reissued Patent: Aug. 13, 2013

(54) HOLSTER FOR HANDGUNS

(76) Inventor: Peter Spielberger, Vienna (AT)

(21) Appl. No.: 13/135,444

(22) Filed: Jul. 6, 2011

Related U.S. Patent Documents

Reissue of:
(64) Patent No.: 7,556,181
Issued: Jul. 7, 2009
Appl. No.: 10/658,486
Filed: Sep. 8, 2003

U.S. Applications:
(63) Continuation-in-part of application No. 09/382,113, filed on Aug. 24, 1999, now Pat. No. 6,616,020, which is a continuation of application No. PCT/AT98/00062, filed on Mar. 10, 1998.

(30) Foreign Application Priority Data

| | | |
|---|---|---|
| Mar. 13, 1997 | (AT) | 435/97 |
| Sep. 18, 1997 | (AT) | 1580/97 |
| Jan. 21, 1998 | (AT) | 101/98 |

(51) Int. Cl.
*F41C 33/02* (2006.01)
*B65D 25/10* (2006.01)

(52) U.S. Cl.
USPC ..... 224/244; 224/243; 224/245; 224/238

(58) Field of Classification Search
USPC ..... 224/244, 243, 245, 911, 912, 913, 224/192, 198, 238, 242
See application file for complete search history.

(56) References Cited

U.S. PATENT DOCUMENTS

| | | | | |
|---|---|---|---|---|
| 3,910,469 | A * | 10/1975 | Baldocchi | 224/198 |
| 4,846,384 | A * | 7/1989 | Perry | 224/244 |
| 5,082,318 | A * | 1/1992 | Held et al. | 294/191 |
| 5,127,566 | A * | 7/1992 | Beletsky | 224/243 |
| 5,284,281 | A * | 2/1994 | Nichols | 224/244 |
| 5,419,474 | A * | 5/1995 | Marx et al. | 224/244 |
| 5,449,103 | A * | 9/1995 | Tilley | 224/244 |
| 6,230,946 | B1 * | 5/2001 | Vor Keller et al. | 224/244 |
| 2005/0035163 | A1 * | 2/2005 | French et al. | 224/243 |

OTHER PUBLICATIONS

10658486 Litigation Search.*

* cited by examiner

*Primary Examiner* — Justin Larson
*Assistant Examiner* — Lester L Vanterpool
(74) *Attorney, Agent, or Firm* — Bennet K. Langlotz; Langlotz Patent & Trademark Works, Inc.

(57) ABSTRACT

A holster assembly for a handgun having various mechanisms for preventing unauthorized access to a handgun therein and wherein the handgun holster is constructed with injection molded, reinforced plastic inserts that are injection overmolded with a chemically compatible material which provides the desired surface characteristics of the holster.

2 Claims, 17 Drawing Sheets

53
36
48
55
57
41
D -- D 63
59
61
36
48
53
58
60
41
C -- C

X-AXIS
53
48
64
57
58
41
60
C
D
C
D
Y-AXIS

HOLSTER FOR HANDGUNS

Matter enclosed in heavy brackets [ ] appears in the original patent but forms no part of this reissue specification; matter printed in italics indicates the additions made by reissue.

The application is a continuation-in-part of U.S. patent application Ser. No. 09/382,113 filed Aug. 24, 1999; now U.S. Pat. No. 6,616,020 which is a continuation of PCT/AT 98/00062 filed Mar. 10, 1998; which is a continuation of the following Austrian patent applications; (a) A 435/97 filed Mar. 13, 1997; (b) A 1580/97 filed Sep. 18, 1997 and (c) A 101/98 filed on Jan. 21, 1998.

DESCRIPTION

Technical Field

The invention relates to a holster assembly for a handgun, and more particularly to such a holster with a retention assembly for preventing unauthorized access to a handgun and more particularly constructed with injection molded, reinforced plastic inserts that are injection over-molded with a chemically compatible material which provides the desired surface characteristics of the holster.

BACKGROUND ART

Handgun users, and particularly Law Enforcement personnel who carry a handgun on a daily basis, carry the handgun in a holster. It is important that the holster provide for a safe quick draw of the handgun and that the handgun be secured in the holster until the authorized user purposely withdraws the handgun. The handgun must be secured so as not to inadvertently fall out of the holster and most importantly secured against being removed from the holster by an adversary.

Prior art describes various holster assemblies designed to address these issues. Prior art is shown in Bianchi U.S. Pat. No. 4,101,060; Rogers U.S. Pat. No. 4,694,890, Rogers U.S. Pat. No. 4,925,075, Rogers U.S. Pat. No. 5,275,317; Rogers U.S. Pat. No. 5,501,381; Nichols U.S. Pat. No. 5,284,281; Salandre U.S. Pat. No. 4,934,574; Marx U.S. Pat. No. 5,419,474; and Beletsky U.S. Pat. No. 5,199,620, The present invention is an improvement over these prior art holsters.

An improved holster assembly is accomplished by utilizing a trigger guard securing mechanism as described in the inventor's U.S. patent application Ser. No. 09/382,113 with the further addition of secondary securing features and locking mechanisms that prevent the trigger guard securing mechanism from being released until a deliberate motion is completed by the user.

Improved surface characteristics are accomplished utilizing modern thermoplastic material and high-pressure injection molding techniques. The present invention is based upon the discovery that a holster assembly comprising inserts of reinforced thermoplastic material, with over-molded thermoplastic material which determines the characteristics of the outer surfaces of the holster, can produce an economical aesthetically pleasing holster. There are six Shore scales that are used to measure the hardness of synthetic materials. They are as follows: Shore A, Shore B, Shore C, Shore D, Shore DO and Shore OO. All of the scales range from 0-100, The most commonly used scales are Shore A and Shore D. There is no direct conversion between the different scales. An example of an approximate comparison would be (Shore A 50=Shore B 30-35=Shore C 20=Shore D 10-15). Another example of approximate comparison would be (Shore A 100=Shore B 85=Shore C 65=Shore D 45). The preferred material used for the insert has a hardness of approximately Shore D 70, When a thermoplastic elastomeric material with a Shore A durometer of 90 or below is used as the over-mold material, the selected holster parts are provided with a soft but durable surface which can be molded with unique and complex characteristics. The thermoplastic elastomeric material should not have a durometer hardness greater than Shore D50, Some synthetic materials have a durometer hardness that would be measured on the Shore A scale. Harder synthetic materials would be measured on the Shore D scale.

The elastomer thermoplastic material provides a completely different and arguably superior holster finish as compared to conventional holsters. The surface provides an aesthetically pleasing finish which can be made in many colors. While not intending to be so limited, the invention will be described in its application to a handgun holster. It will be understood that the basic teachings of the present invention can be applied to other types of holsters.

It is an object of the present invention to provide an improved handgun holster.

It is also an object of the present invention to provide an improved holster with novel structure for securing the handgun from being withdrawn from the holster until the authorized user intends to do so.

It is another object of the present invention to provide an improved holster with novel structure for securing the handgun that requires a difficult and unnatural motion for anyone except the authorized user thereby minimizing the possibility of an unauthorized assailant withdrawing the handgun.

It is an additional object of the present invention to provide an improved holster with novel structure for securing the handgun that allows the authorized user to quickly and naturally withdraw the handgun in a safe manner.

It is a further object of the present invention to provide an improved holster with novel structure for securing the handgun that allows for remote operation of the securing mechanism.

It is also an object of the present invention to provide an improved holster with novel structure for securing the handgun that allows for positive identification of the user before the handgun can be withdrawn.

It is another object of the present invention to provide for unique soft to the touch thermoplastic elastomer surface characteristics on the holster.

Finally, it is an object of the present invention to provide a holster assembly with the above features which is also both strong and durable.

DISCLOSURE OF THE INVENTION

According to the invention there is provided an improved holster having a retention device which secures the handgun from being withdrawn from the holster until the retention device has been released. The retention device must first be unlocked by a deliberate motion of the user. A holster according to the invention is constructed with an assembly which includes a pocket for receiving a handgun and the pocket has a recess for accepting the trigger guard of the handgun. The pocket has outer and inner sides and is generally "U-shaped" in such a fashion as to cover the handgun. The pocket is assembled using components that incorporate interior supporting structures referred to as inserts which are molded of a reinforced thermoplastic material. The inserts are overmolded with a thermoplastic material which provides them with the desired surface characteristics. The inserts are precisely dimensioned so that their areas to be over-molded are smaller than the finished component. The inserts are designed to give maximum strength to the holster and are shaped to promote the flow of the over-mold material. When the thermoplastic material of the inserts and the over-mold elastomer material are both of the same chemical base, the over-mold layer will bond both mechanically and chemically with the inserts and will provide the holster with soft, but durable aesthetically pleasing surfaces. These surfaces may be smooth or textured to enhance the feel and appearance of the holster.

The retention assembly structure is located in the recess designed for accepting the handgun trigger guard and comprises a movable pin that positively captures the trigger guard. The movable pin is preferably spring loaded in the direction of capturing the trigger guard and is further beveled towards the receiving aperture of the trigger guard recess. The moveable pin in this configuration contacts a spring loaded catch that moves out of the way when the gun is inserted and the moveable pin subsequently engages the trigger guard to secure the handgun. The end of the pin opposite its retaining end is provided with structure that engages a fork shaped actuating wedge. The actuating wedge is moveable perpendicular to the centerline of the retention pin. To release the handgun the moveable retention pin is pulled from the trigger guard recess by pushing the actuating wedge in a perpendicular plane to the centerline of the retention pin. This motion slides the wedge in such a manner as to pull open the retention pin by the nature of the wedge shape. The actuating wedge is spring loaded to return to its resting position, which, in turn, returns the retaining pin to its locked position. The engagement between the retention pin and actuating wedge is such that the retention pin can move independently of the actuating wedge and upon re-holstering the handgun trigger guard pushes the pin against its spring tension allowing the pin to move out of the way followed by returning to capture the trigger guard when the trigger guard is fully inserted into the trigger guard recess.

To provide the holster with the desired level of security the actuating wedge cannot be pushed without purposely moving a locking slide. The locking slide is moveable perpendicular to the motion of the actuating wedge and is provided with structure that locks the actuating wedge until the locking slide is moved into its unlocked position. The locking slide can further be provided with a secondary locking structure such as a pin that engages with the locking slide or the actuating wedge. The secondary lock can be remotely unlocked pneumatically, electrically or by any other suitable means. The locking mechanism of the holster can also be provided with features that positively identify the authorized user of the holster, such as a Biometric finger print reader, a coded magnetic ring, etc.

To further enhance the security of the holster the present invention can be provided with a safety strap spanning the open end of the holster capturing the handgun until the strap is opened or moved out of the way. In the preferred embodiment both ends of the strap are pivotally fastened to opposite sides of the holster. The safety strap is pivotable from the first security position, which inhibits removal of the handgun from said holster, to a second position substantially free of the handgun, allowing the handgun to be withdrawn from the holster. The safety strap is pivoted by the motion of the actuating wedge through a mechanical linkage. The safety strap can also be of a more conventional style having both ends fastened to opposite sides of said holster by snap members. Utilizing a conventional snapped strap may be preferable under some conditions and because the handgun is otherwise secured by the retention pin, the handgun remains secure even if the strap becomes un-snapped. Additionally, to enhance the security of a snapped strap, the strap can be provided with a formed releasing element shaped to release the snap using a generally downward motion of the users hand.

DETAILED DESCRIPTION OF THE INVENTION

Figure 1:
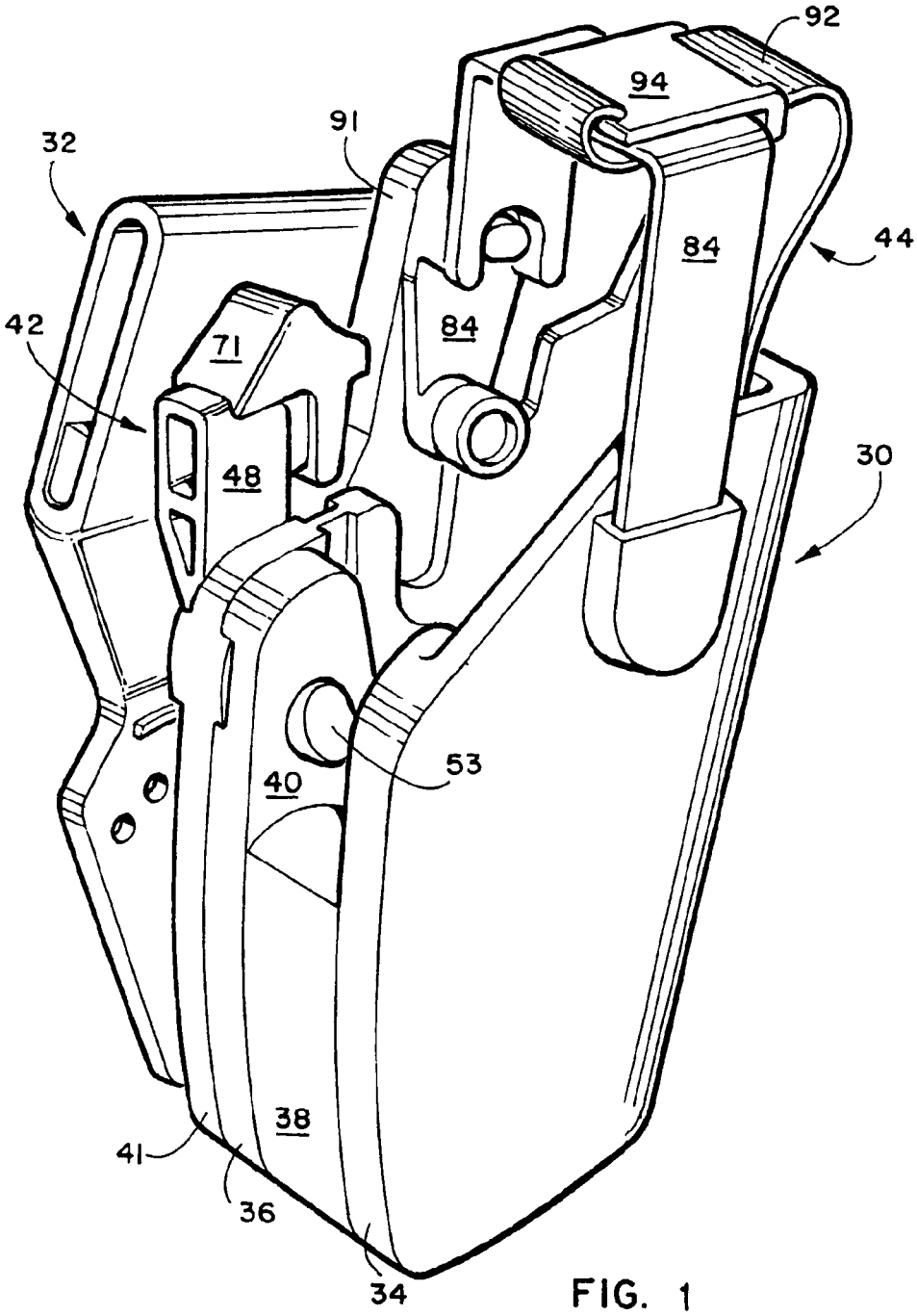
FIG. 1 is a rear perspective view of the holster fastened to a belt carrier.

It will be understood by one skilled in the art that, for each type or model of holster to which the present invention is to be applied, the finished holster, and components thereof must be appropriately designed in accordance with the teaching of the present invention. The exemplary holster is assembled from several components and the number, size and precise shape of the components can vary. Each holster will contain such components as required, depending on the particular handgun used in the holster and the desired security level of the holster.

The handgun holster will now be described by referring to FIGS. 1-4 of the drawings. The holster is generally designated numeral 30 and it is shown secured to a belt carrier 32. Holster 30 is a tubular assembly generally opened at its bottom end but it may also be closed if so desired. The primary structure of holster 30 is an exterior right side wall or panel 34, an interior left side wall or panel 36 and one or more spacer panels 38. The length of the spacer panels is less than the length of the left and right side walls thereby forming a recess 40 for receiving the trigger guard of a handgun. A plate-shaped carrier member 41 is secured to the outer surface of interior left side wall 36.

Figure 2:
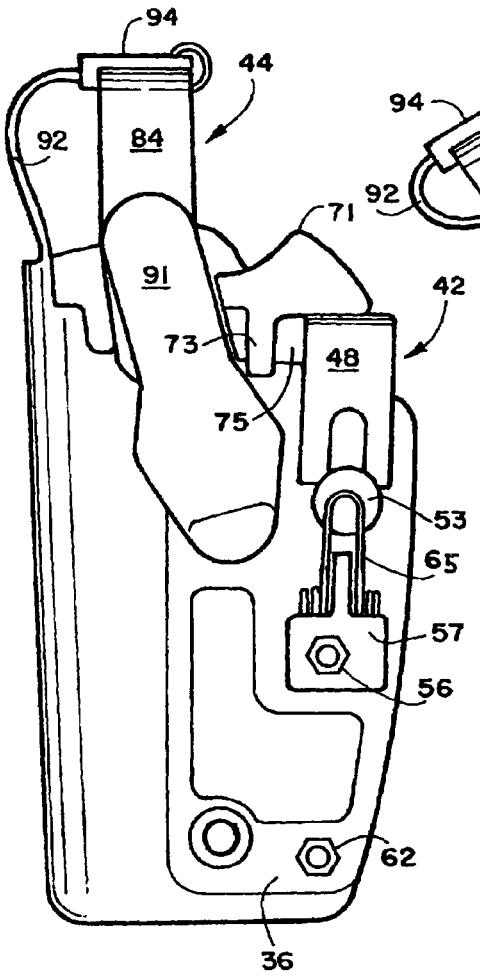
FIG. 2 is a left side elevation view with the locking strap in the position for securing a handgun therein.
Figure 3:
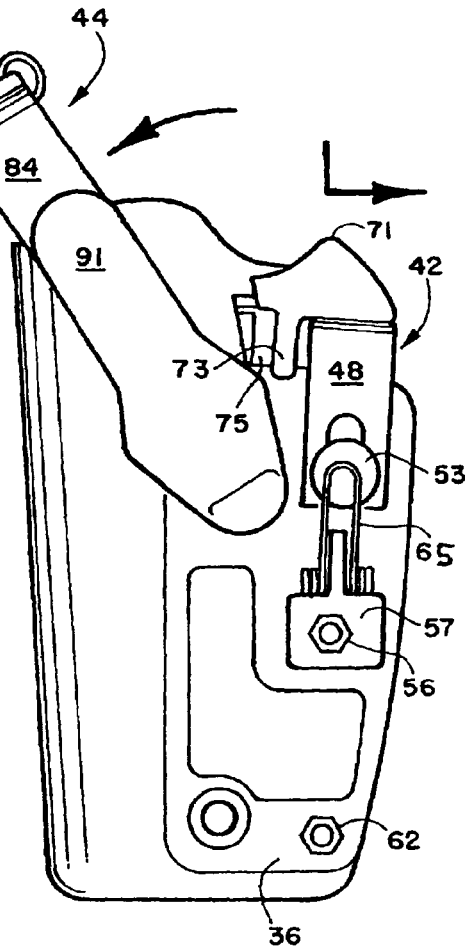
FIG. 3 is a left side elevation view with the locking strap in the position that allows removal of the handgun.
Figure 4:
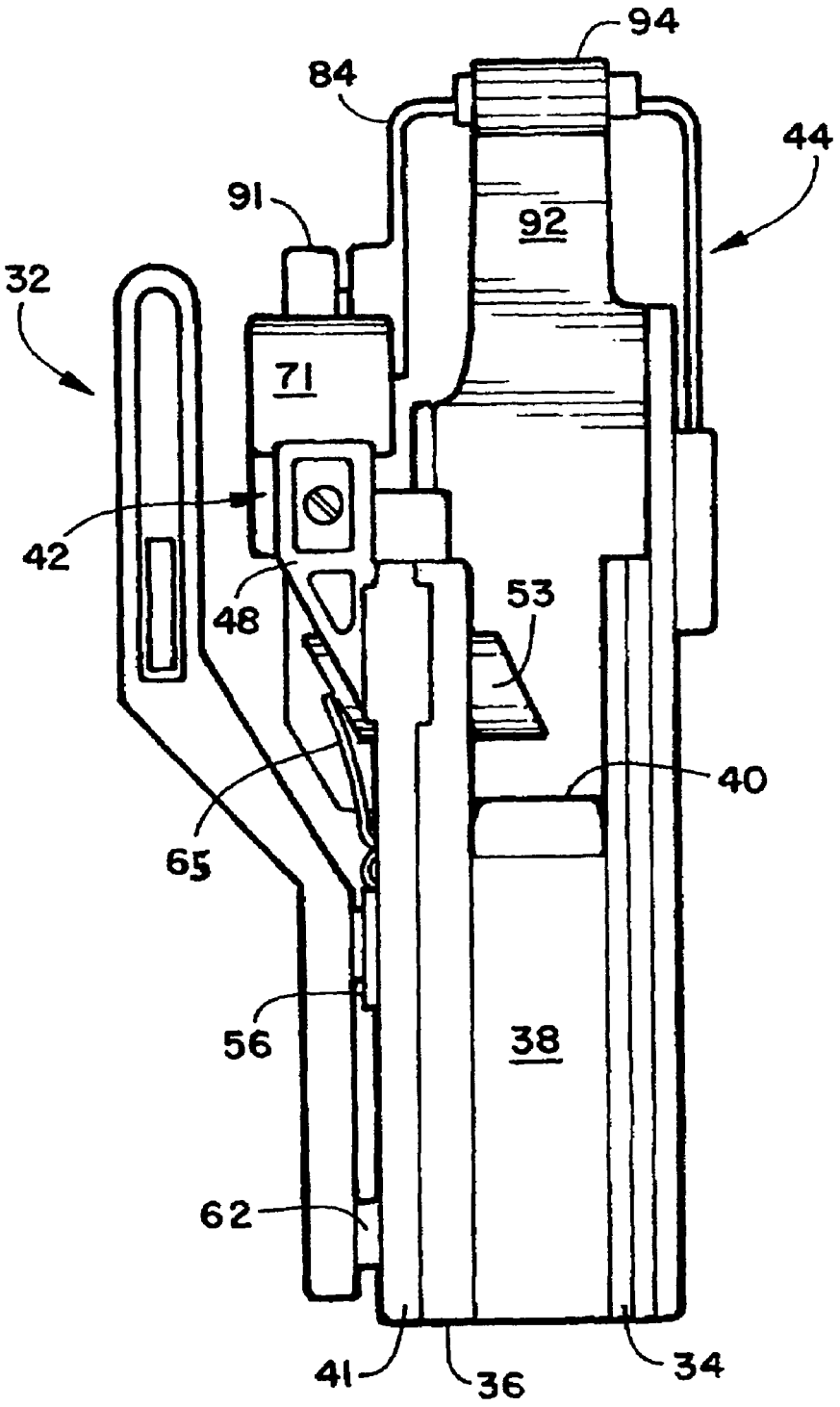
FIG. 4 is a rear elevation view of the handgun holster.
Figure 7:
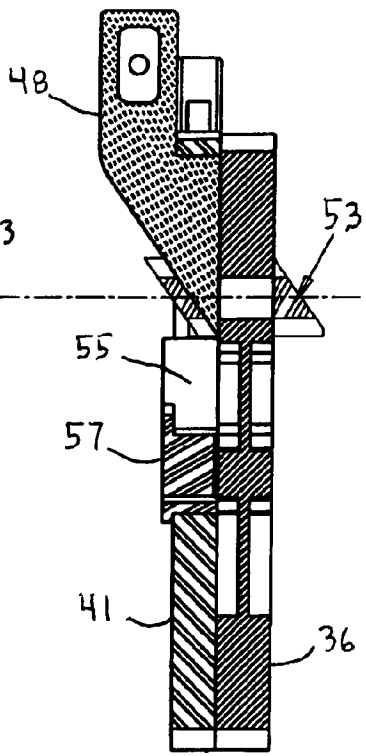
FIG. 7 is a schematic cross sectional view taken along lines B-B of FIG. 5.
Figure 6:
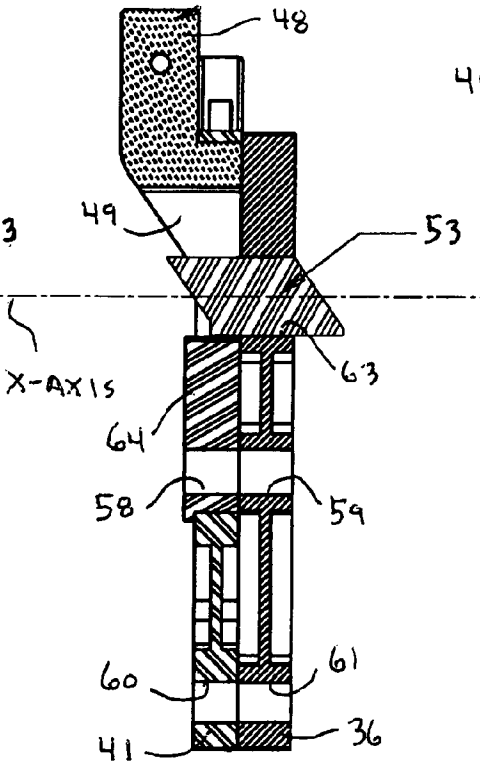
FIG. 6 is a schematic cross sectional view taken along lines A-A of FIG.5.
Figure 5:
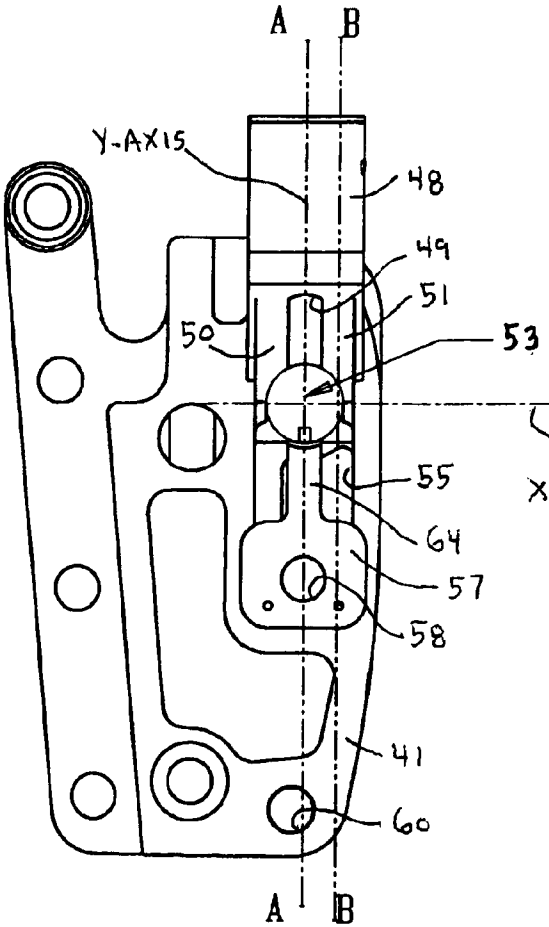
FIG. 5 is a schematic left side elevation view of the plate-shaped carrier member mounted on the inner exterior wall with the primary handgun locking mechanism shown in the locked position.

The primary locking mechanism 42 is supported and mounted on plate-shaped carrier member 41 as clearly shown in FIGS. 2-4. A secondary locking mechanism is provided by locking strap assembly 44.

Figures 8, 9, 10:
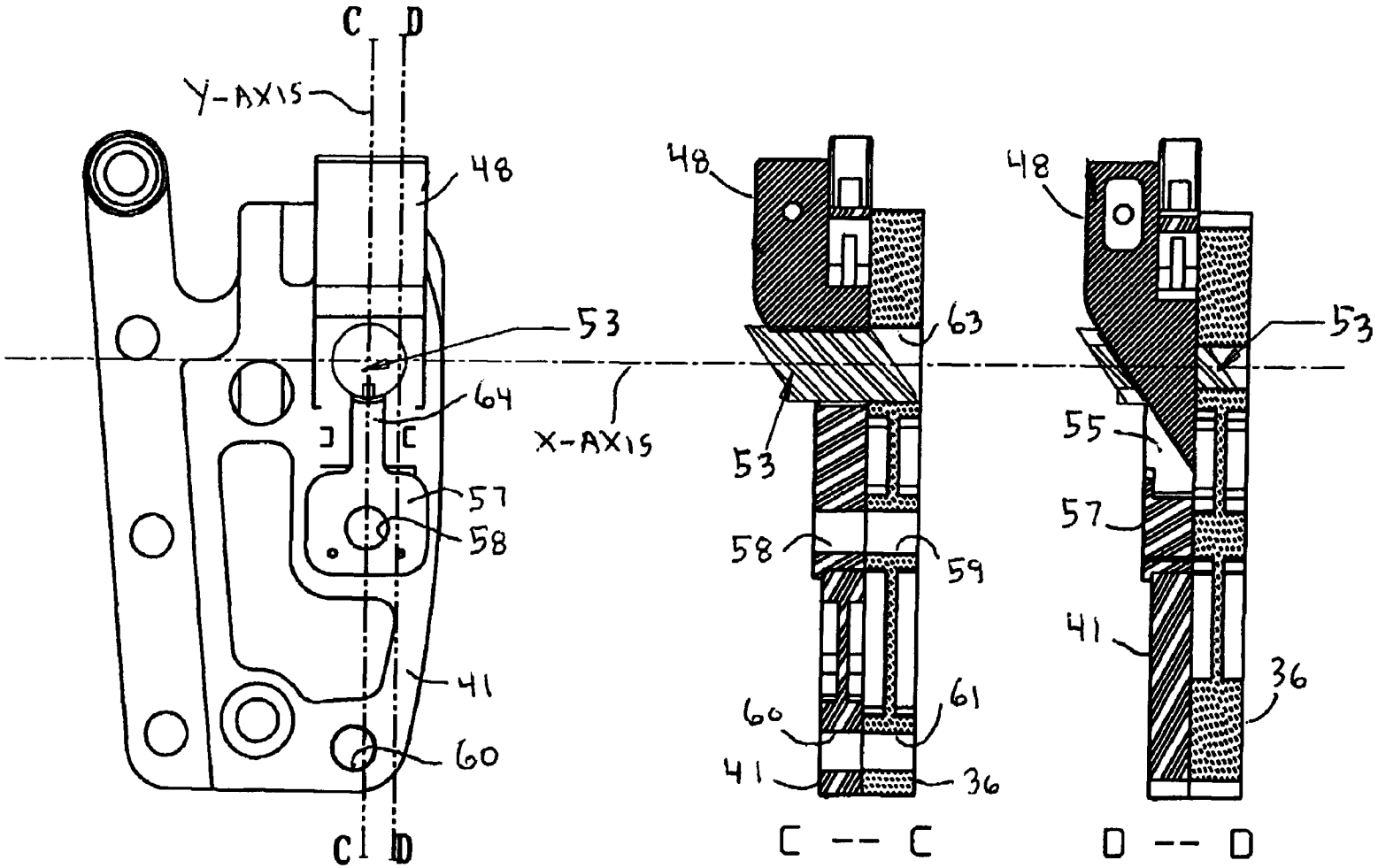
FIG. 8 is a schematic left side elevation view of the plate-shaped carrier member mounted on the inner exterior wall with the primary handgun locking mechanism shown in the unlocked position.
FIG. 9 is a schematic cross sectional view taken along lines C-C of FIG. 8.
FIG. 10 is a schematic cross sectional view along lines D-D of FIG. 8.

Referring to FIGS. 5-10, the primary locking mechanism 42 will now be discussed. Primary locking mechanism 42 is attached and supported on plate-shaped carrier 41. Primary locking mechanism 42 has a fork-shaped actuating wedge 48 that travels up and downwardly along a Y-axis. Actuating wedge 48 has a slot 49 that forms a pair of laterally extending fingers 50 and 51. Fingers 50 and 51 mate with and travel in their respective grooves along the outer surface of retention pin 53. The bottom ends of fingers 50 and 51 also seat in a recess 55 in the outer surface of plate-shaped carrier 41 and act as a track along which they can travel. Spring mounting member 57 has a protrusion in its bottom surface that seats in recess 55. A bore hole 58 receives an internally threaded bolt 56 that also passes through a bore hole 59 in inner exterior wall 36 and also passes through aligned bore holes in spacer panels 38 and has its front end screwed onto a bolt molded in exterior right side wall 34. This is the structure that holds the respective wall panels together. Another internally threaded bolt 62 would also pass through bore holes 60 and 61 and into aligned bore holes in spacer panels 38 to be threaded onto another bolt also molded into exterior right side wall 34. Retention pin 53 travels inwardly and outwardly through bore hole 63 in exterior left side wall 36. The front end of neck portion 64 helps retention pin 53 to track properly along its X-axis that is substantially perpendicular to the Y-axis. In FIG. 1, retention pin 53 extends into recess 40. In FIG. 8, actuating wedge 48 has been pushed downwardly along the Y-axis to engage retention pin 53 and withdraw it from recess 40.

Figure 13:
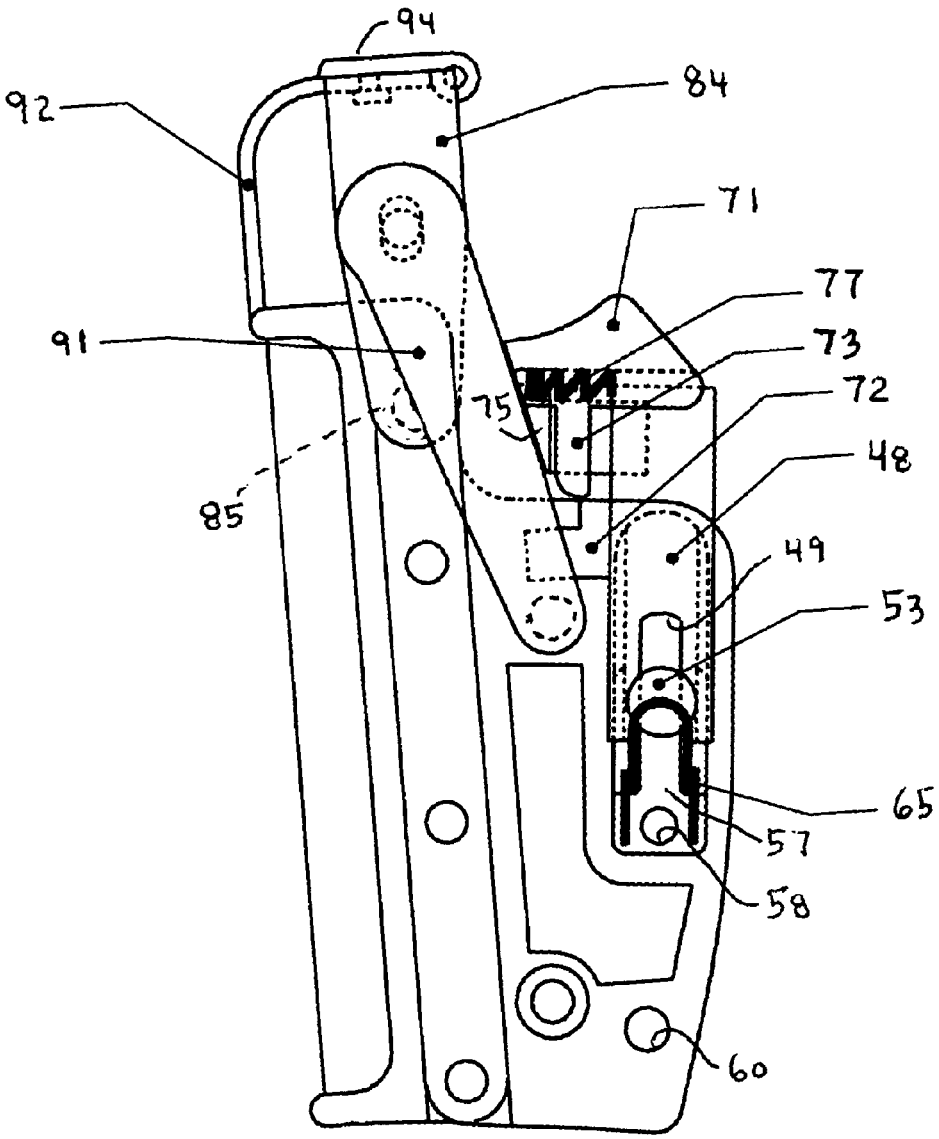
FIG. 13 is a schematic left side view of the handgun holster with the primary handgun locking mechanism shown in the locked position.
Figure 14:
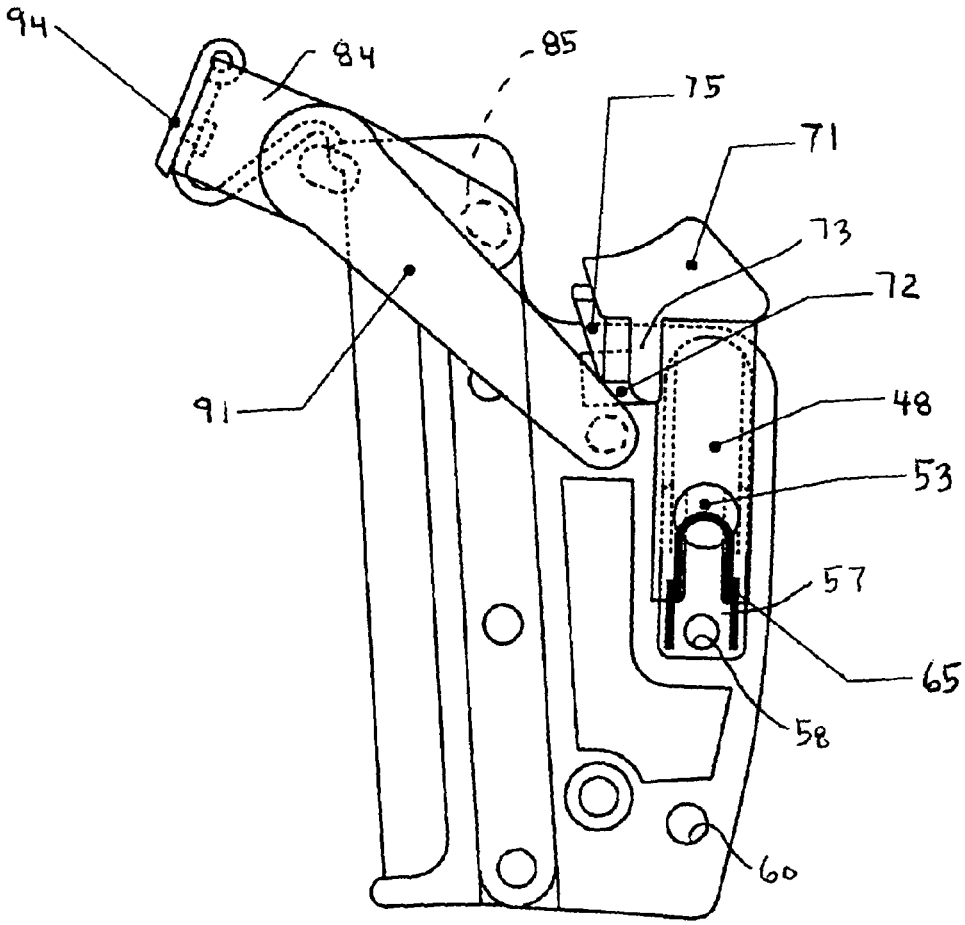
FIG. 14 is a schematic left side view of the handgun holster with the primary handgun locking mechanism shown in the unlocked in position.
Figure 15:
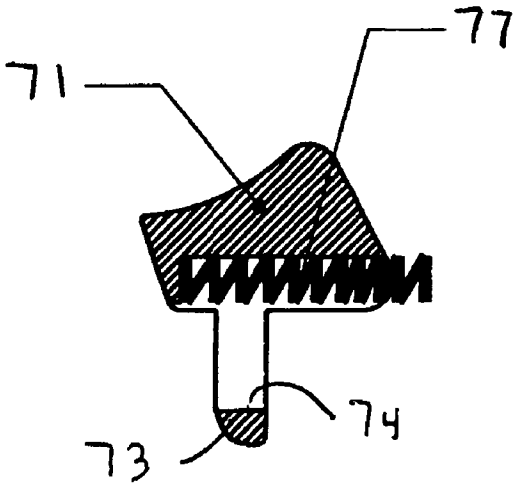
FIG. 15 is a schematic cross sectional view of the locking slide shown with the return spring in place.
Figure 16:
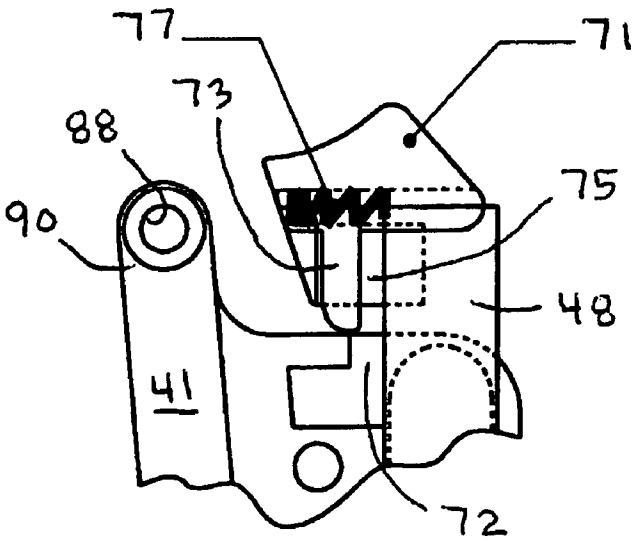
FIG. 16 is a schematic fragmentary left side elevation view of the locking slide.

A spring 65 (seen in FIGS. 13-14) is connected to spring mounting member 57 and its forward end presses against the beveled top surface of retention pin 53. The engagement between moveable retention pin 53 and actuating wedge 48 as seen in cross sections AA-DD of FIGS. 5-10 is such that the retention pin 53 can move independently of the actuating wedge 48 allowing the retention pin 53 to move upon re-holstering of the handgun. The force of spring 65 upon returning the retention pin 53 to its home position also returns the actuating wedge 48 to is home or upward position by the nature of its wedge shape; the wedge shape that pulls the retention pin out works in reverse to return the actuating wedge to its upright position.

Figure 11:
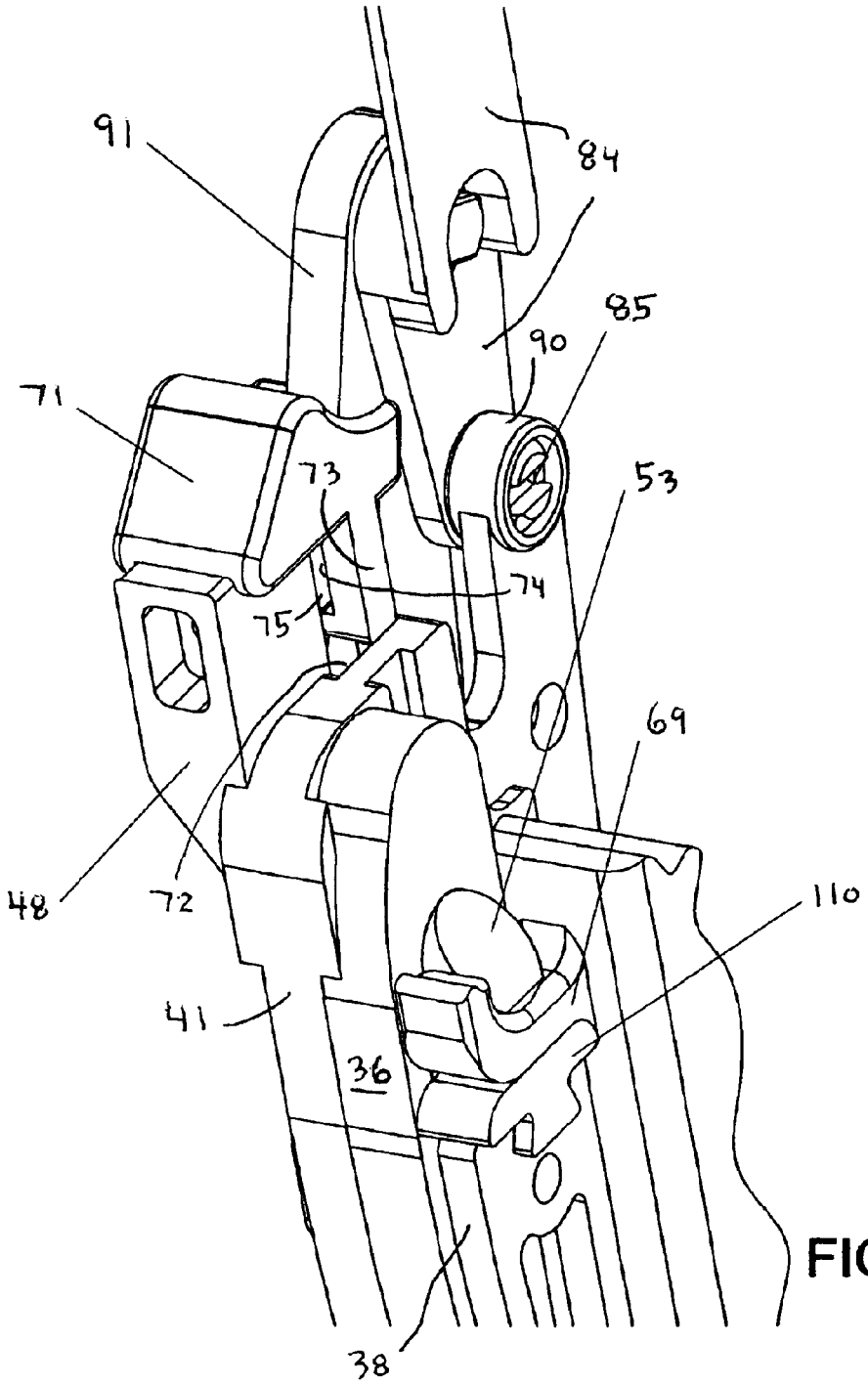
FIG. 11 is a partial interior perspective view of the primary handgun locking mechanism shown with a handgun trigger guard locked in place.

Moveable retention pin 53 is moveable into and out of recess 40 which is designed for accepting the handgun trigger guard 69 (see FIG. 11). Moveable retention pin 53 moves in a direction perpendicular to recess 40 to positively capture the trigger guard 69 of a handgun. Moveable retention pin 53 is provided with a spring 65 that pushes in the direction of capturing the trigger guard as shown in FIG. 11. Moveable retention pin 53 is further beveled toward the receiving aperture of the trigger guard recess 40. The bevel provides a surface that rides on the trigger guard of the handgun as the handgun is being holstered. As the trigger guard rides on the beveled surface, the moveable retention pin 53 is forced against spring 65 thus moving the retention pin into a position allowing the trigger guard to pass by. After the trigger guard has passed by the moveable retention pin 53 it returns to its locked position due to the spring pressure, thus capturing and securing the trigger guard of the handgun.

The end of the moveable locking pin 53 opposite its beveled retaining end is provided with a detail engaging the fingers 50 and 51 of the forked-shaped wedge 48. The detail is shown in cross sections AA-DD. Actuating wedge 48 is moveable perpendicular to the center line of the moveable retention pin 53 in a generally downward motion opposite the direction of withdrawing the handgun from the holster. The actuating wedge 48 is beveled in a wedge shape that slides over the retention pin 53. To release the handgun the moveable retention pin 53 is moved out of the trigger guard recess 40 by pushing the actuating wedge 48 downward in a perpendicular plane to the center line of the retention pin 53. As the actuating wedge 48 is pushed the wedge shape rides on the detail of the moveable retention pin 53 and the retention pin 53 is pulled free of the handgun trigger guard 69 allowing the handgun to be withdrawn from the holster body.

Figure 18:
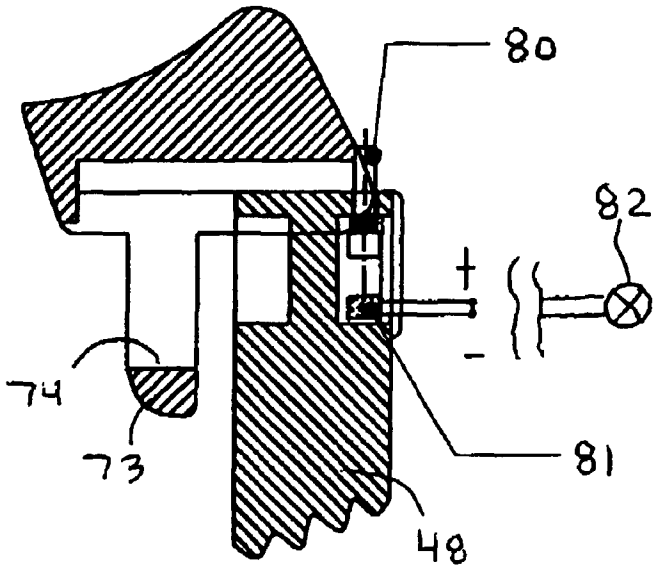
FIG. 18 is an enlarged schematic cross sectional view of the alternative embodiment of the locking slide having the remote locking mechanism in the locked position.
Figure 17:
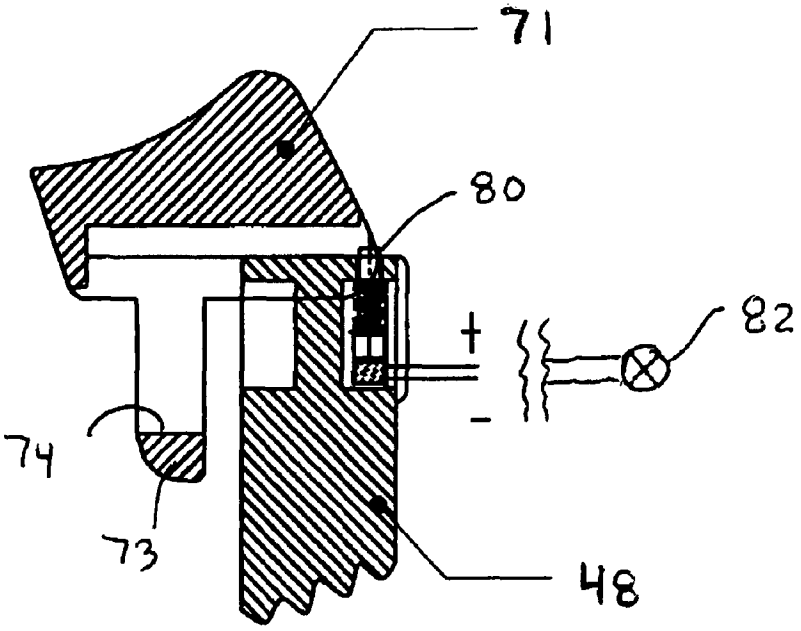
FIG. 17 is an enlarged schematic cross sectional view of an alternative embodiment of the locking slide having a remote locking mechanism in the un-locked position.

A holster of the present invention provided with the locking assembly as described above securely retains the handgun and the handgun can be withdrawn quickly. However, in a Law Enforcement situation an adversary could also easily withdraw the handgun. In the preferred embodiment the holster of the present invention is further equipped with a locking slide 71 (see FIGS. 11-14). Locking slide 71 substantially reduces the chance of an adversary withdrawing the handgun. Locking slide 71 is designed to be operated with the thumb of the holster user and is moveable in a perpendicular rearward direction to the downward motion of the actuating wedge 48 and is provided with locking sleeve portion 73 that locks actuating wedge 48 until the locking slide 71 is moved into the unlocked position. To operate the holster the user uses locking slide 71 in a motion sliding it to the rear of the holster while at the same time pushing with a downward motion. As soon as the locking sleeve portion 73 moves in line with the locking slot 72, the locking slide 71 can move downward allowing the actuating wedge 48 to operate. Locking sleeve portion 73 has a central opening 74 that tracks along locking slide post 75 whose bottom end is secured in actuating wedge 48. Under the pressure of the user's thumb the actuating wedge 48 is pushed downward forcing the actuating wedge shape to engage on moveable retention pin 53. Actuating wedge 48 pulls the retention pin 53 free of the handgun trigger guard 69 allowing the handgun to be withdrawn from the confines of the holster body. Locking slide 71 is provided with a turn spring 77 that returns the locking slide 71 to its rest position after actuating wedge 48 returns to a position that allows the locking slide member 71 to move. Moveable components of the holster such as locking slide member 71 or actuating wedge 48 can further be provided with a secondary locking structure such as pin 80 shown engaging locking slide member 71 (see FIGS. 17-18). The secondary locking means can be operated by any suitable structure and is shown in FIGS. 17 and 18 operated by electromagnet 81 via wires attached to a remote power switch 82 located somewhere on the holster users body.

Figure 24:
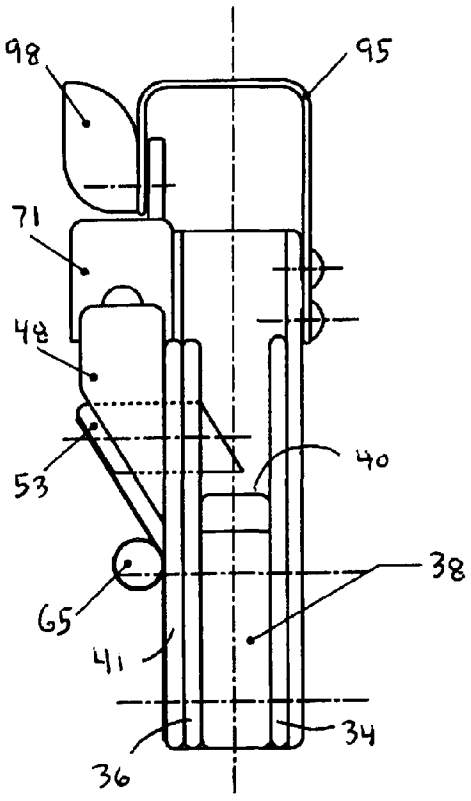
FIG. 24 is a schematic rear elevation view of the handgun holster shown in the locked position, provided with a snap style safety strap.
Figure 23:
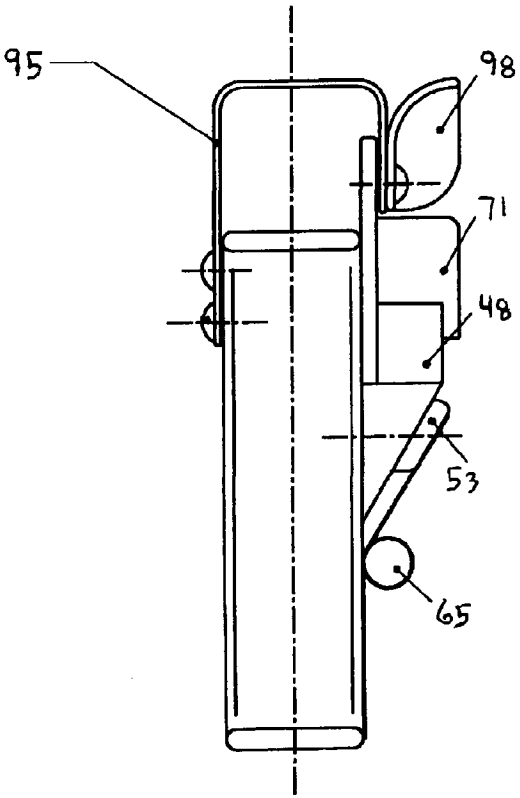
FIG. 23 is a schematic front elevation view of the handgun holster shown in the locked position, provided with a snap style safety strap.
Figure 26:
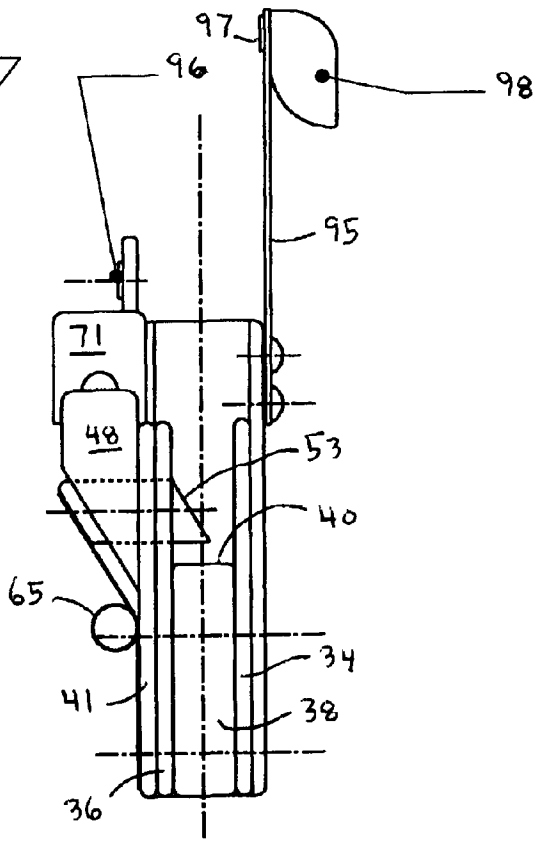
FIG. 26 is a schematic rear elevation view of the handgun holster, provided with a snap style safety strap, shown with the safety strap open and the holster unlocked.
Figure 25:
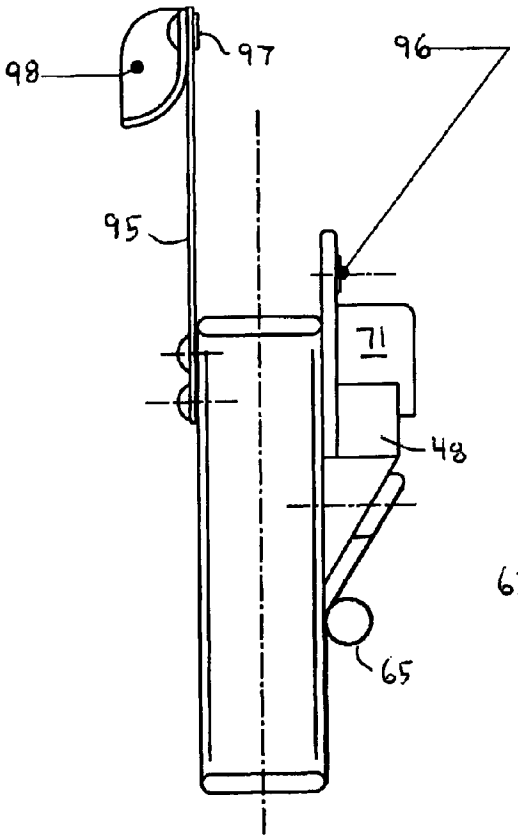
FIG. 25 is a schematic front elevation view of the handgun holster, provided with a snap style safety strap, shown with the safety strap open and the holster unlocked.

Safety strap assembly 44 (see FIGS. 1 and 13-14) is included to further enhance the security of the holster of the present invention by capturing the handgun around the top opening of the holster. The safety strap assembly 44 of the preferred embodiment spans the top end of the holster and captures the handgun until the strap is pivoted out of the way. Both ends of strap 84 are fastened to the holster by stub axles or pins 85 and 86. Safety strap 84 is U-shaped and made of hard plastic. Stub axle or compressible pin 85 has a pair of spring fingers that pop into a bore hole 88 formed in a tubular bushing portion 90 on the top end of interior side wall 36. Safety strap 84 is pivoted forward and into the open position shown in FIG. 14 by the motion of the top edge of locking slide post 75 sliding on and operating mechanical linkage arm 91. Safety strap 84 is returned to its closed position and held by the natural spring action of the integrally molded tongue member 92. Tongue member 92 is molded as part of the over molded assembly as later described. The safety strap 95 can also be of a more conventional style having both ends fastened to opposite sides of the holster as shown in FIGS. 23-26. Safety strap 95 is secured by male snap member 96 mating with the female snap member 97 on releasing element 98. With snap safety strap 95 it is desirable to provide a formed releasing element 98 shaped to release the snap assembly using a generally downward motion of the user's thumb wedging the snap assembly apart. FIGS. 23 and 24 show the holster and the safety strap 95 in the locked position. FIGS. 25 and 26 show the holster unlocked with the safety strap open demonstrating that the safety strap with a snap is assembly independent of the holster locking mechanism as opposed to the pivoting safety strap by that operates in conjunction with the holster locking mechanism.

Figure 12:
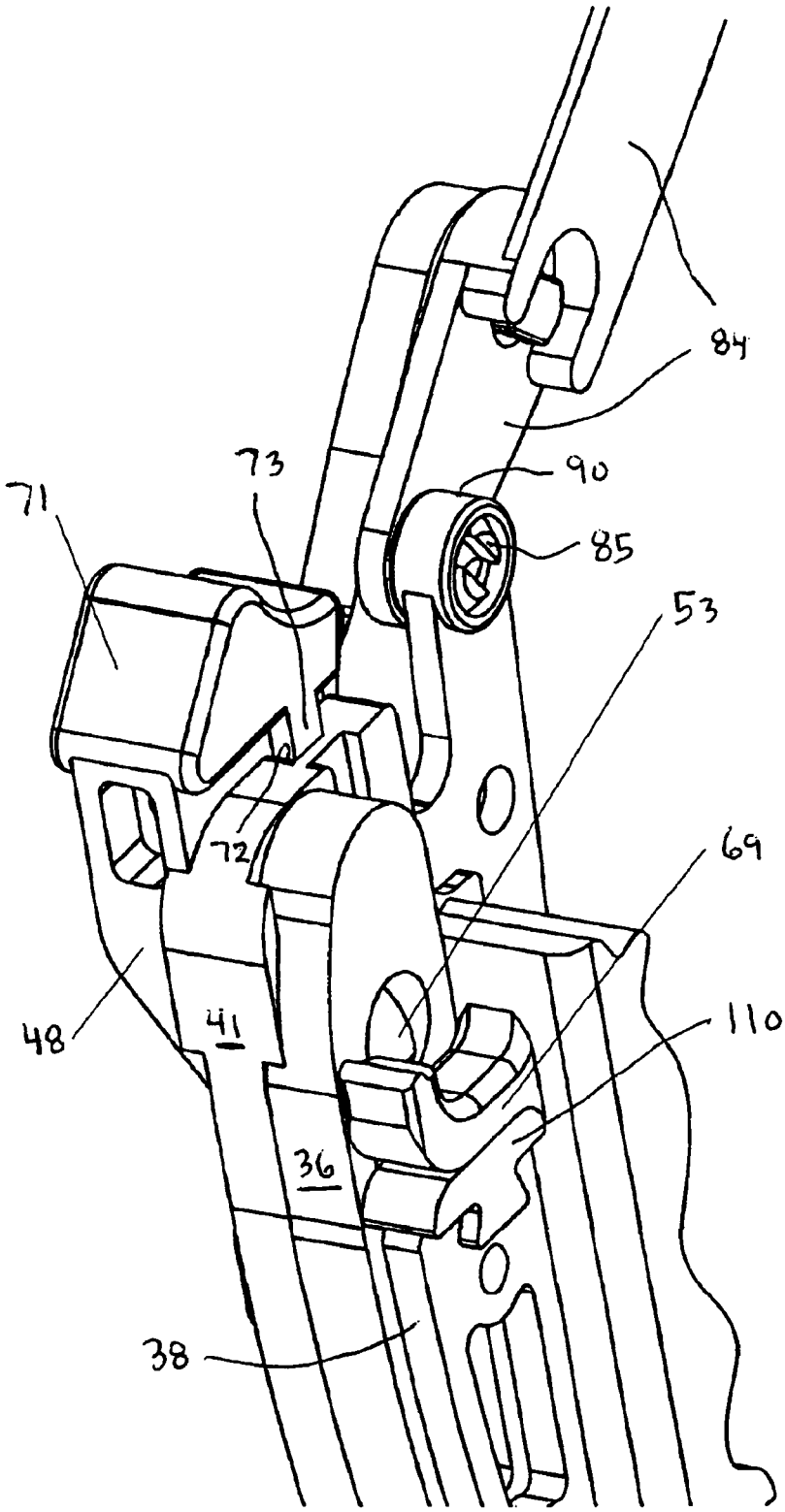
FIG. 12 is a partial interior perspective view of the primary handgun locking mechanism shown with a handgun trigger guard unlocked and ready for removal.
Figure 27:
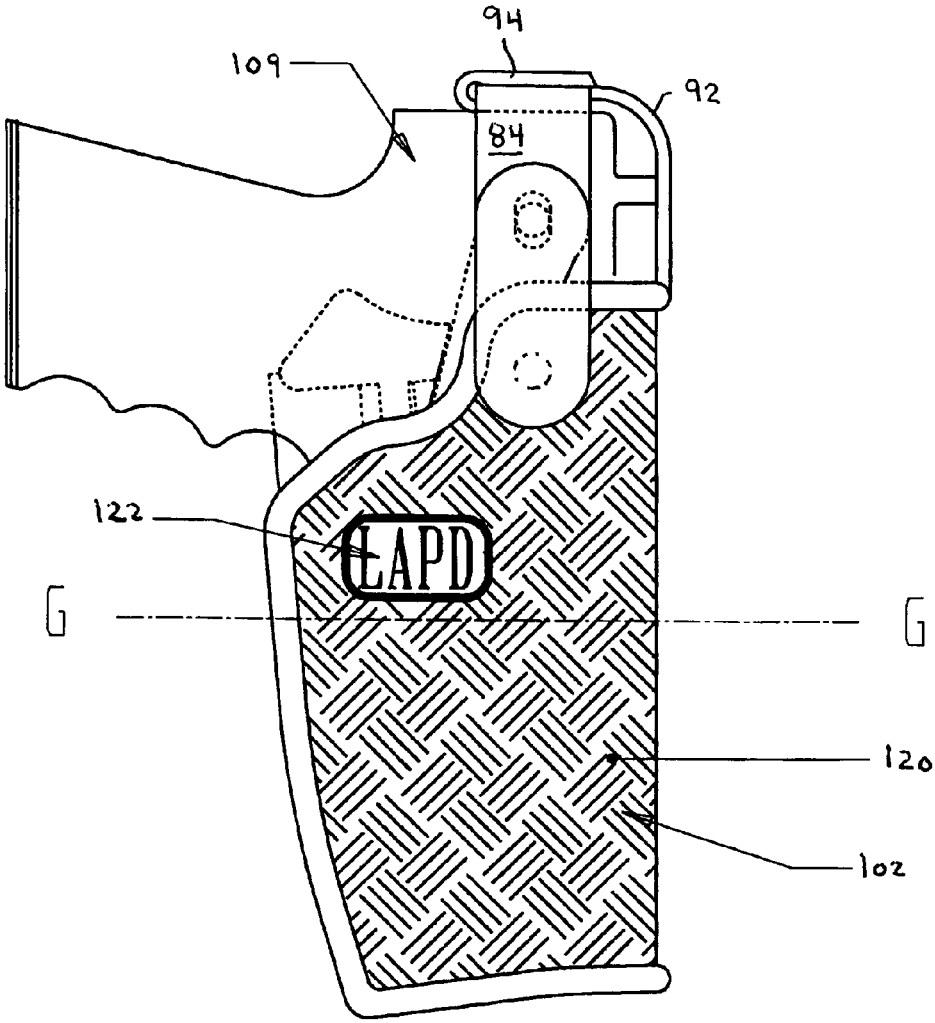
FIG. 27 is a right side elevation view showing a handgun holstered in place and illustrating an example of both texture and insignia.
Figure 28:
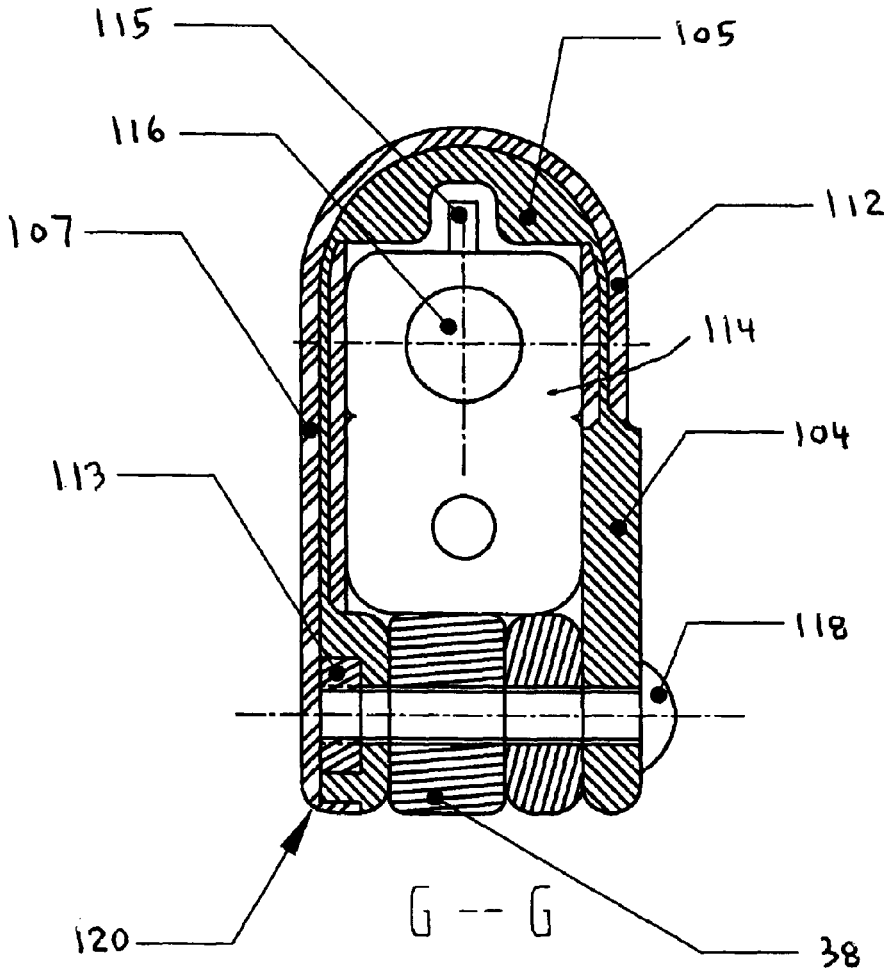
FIG. 28 is schematic cross sectional view taken along lines G-G of FIG. 27 showing the over-molded structure with a threaded nut molded therein and a screw holding the assembled parts together.

The exemplary holster body is assembled from several components. The number, size and precise shape of the components depend on the particular handgun the holster is designed for and the desired security level of the holster. In the example embodiment the holster body is comprised of spacer plates or panels 38 and side walls 34 and 36 of FIG. 1. Main body 102 shown in FIG. 27 is comprised of a combination of structural inserts 104, functional inserts 105 and over-molded sections 107 as seen in FIG. 28. Spacer panels 38 and/or walls 34 and 36 can be added, subtracted or modified to adjust the width of the holster to accommodate handguns of varying widths. Spacer panels 38 can also be provided with cushion areas that interface with the handgun 109. An example of the cushion area is seen in FIG. 12 which shows a cushion 110 mounted in a key way in the top of the center spacer panel 38. Cushion 110 can be made of any suitable resilient material and serves to apply pressure on the trigger guard 69 pushing it against movable retention pin 53 thus taking up any unwanted space between center spacer panel 38, trigger guard 69 and retention pin 53. Cushion 110 can also be replaced with a spring loaded pad if desired. A spring loaded pad would function to apply pressure in a direction toward the retaining pin 53.

The main holster body 102 in FIG. 27 is molded in a multi-step process. In some embodiments additional parts may be used such as threaded screw nuts 113 imbedded on or molded as part of the inserts, as will be described hereinafter. In the example embodiment, the first step is the injection molding of the strong substantially rigid insert pieces. The insert or inserts are best shown in FIG. 28, and can consist of a single unit or multiple separate pieces and are generally indicated and shown as a single insert unit 104, 105. The insert sections 104 and 105 constitute substantially the strength of the finished holster body and serve as the skeleton for the elastomeric over-molded covering 112. The structural insert section 104 of FIG. 28 provides generally a structure that is dimensioned to fit the particular handgun for which the holster is designed and to provide a solid structure suitable for assembling to the remaining components. The holster may have any appropriate shape including the well-known "pocket" configuration, open at the top and bottom ends. FIG. 28 shows an example handgun muzzle 114 inserted into the holster with sight rail 115 and barrel 116 visible. Functional insert 105 is generally shaped to accept and guide details of the handgun such as sight rail 115 to provide a closely fitting holster that holds the handgun in a precise fashion. The structural inserts can have threaded nut inserts 113 or other components molded as part of the inserts to facilitate assembly of the holster by means such as example screw 118.

Inserts 104 and 105 are preferably molded of a strong, reinforced, synthetic material. Any appropriate synthetic material can be used as long as it is chemically compatible with the over-molded material. The synthetic material of the inserts may include a reinforcing filler material. Some examples of a reinforced material are: 1) a fiberglass reinforced, olefin base, thermoplastic material, 2) a fiberglass reinforced, nylon material 3) a fiberglass reinforced polypropylene material. When the preferred thermoplastic elastomer TPE over-mold is used as is described hereinafter, an olefin base thermoplastic material is necessary for the insert because, under these circumstances, the over-mold material will chemically bond with the insert material. When the injection molded insert comprises an olefin thermoplastic, the over-mold layer may comprise an olefin base thermoplastic elastomer that chemically bonds to the injection molded insert. When the injection molded insert comprises a fiberglass reinforced polypropylene, the over-mold layer must comprise an olefin base thermoplastic elastomer so as to chemically bond to the injection molded insert. Excellent results have been achieved, for example, when specific formulations of polypropylene are used as the base reinforcing insert. Any suitable materials can be used as long as the insert and over mold material are chemically compatible. An ideal material is a Homopolymer polypropylene that provides excellent adhesion to compatible olefin elastomers as well as a high resistance to abnormal sinks and flow lines. This material, once cured, has a great scratch resistance and a higher flexural modulus than co-polymer polypropylene. An example of such material is manufactured by DSM Engineering Plastics of Stoney Creek, Ontario, Canada and is identified as product code J60-30.

The inserts are designed to give maximum strength to the finished holster body. In addition, the inserts may be cored out in critical thick areas to reduce warping, excessive swelling or other deformation of the insert.

Each insert is precisely dimensioned so that its areas to be over-molded are smaller than the finished holster body. The dimensions are chosen to minimize warpage of the insert and to allow for proper flow and bonding of insert material over the insert and for proper over-molding material flow and bonding.

Once inserts (or insert) 104 and 105 are molded, the next step is to mount the inserts in final molds and injection mold (over-mold under heat and pressure) thereon the thermoplastic elastomer 112 seen in FIG. 28. As indicated above, the thermoplastic elastomeric material preferably should be chemically compatible with the material from which the inserts are molded so that a chemical bond occurs between the synthetic material of the insert and the thermoplastic elastomer of the over-mold. Excellent results have been provided, for example with a thermoplastic elastomer provided by Advanced Elastomer Systems of St. Louis, Mo., under the trademark SANTOPRENE.

Figure 20:
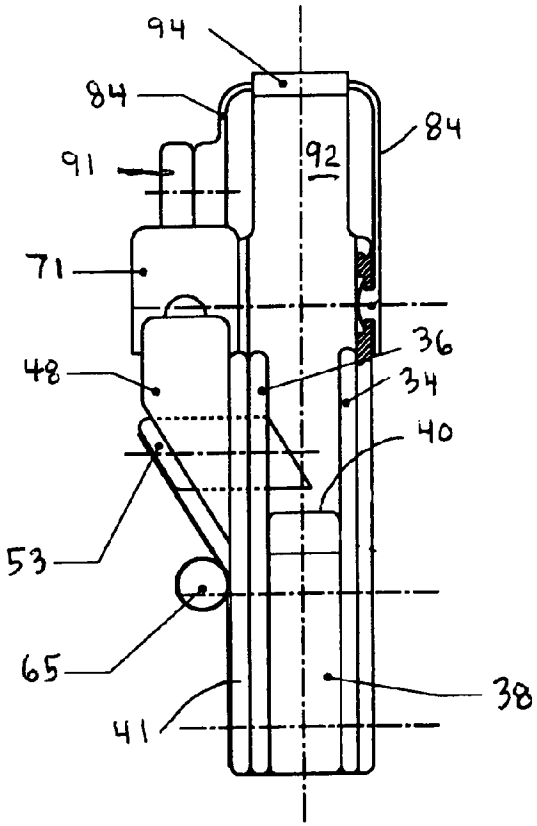
FIG. 20 is a schematic rear elevation view showing the primary handgun locking mechanism in the locked position.
Figure 19:
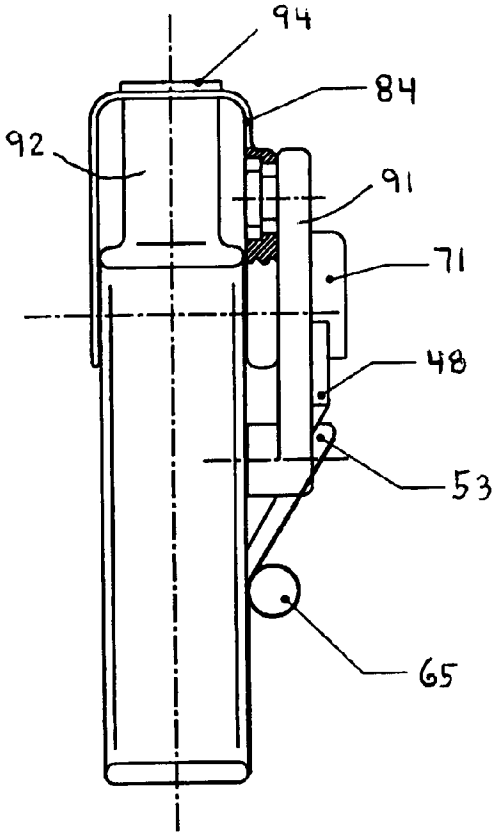
FIG. 19 is a schematic front elevation view showing the primary handgun locking mechanism in the locked position.
Figure 22:
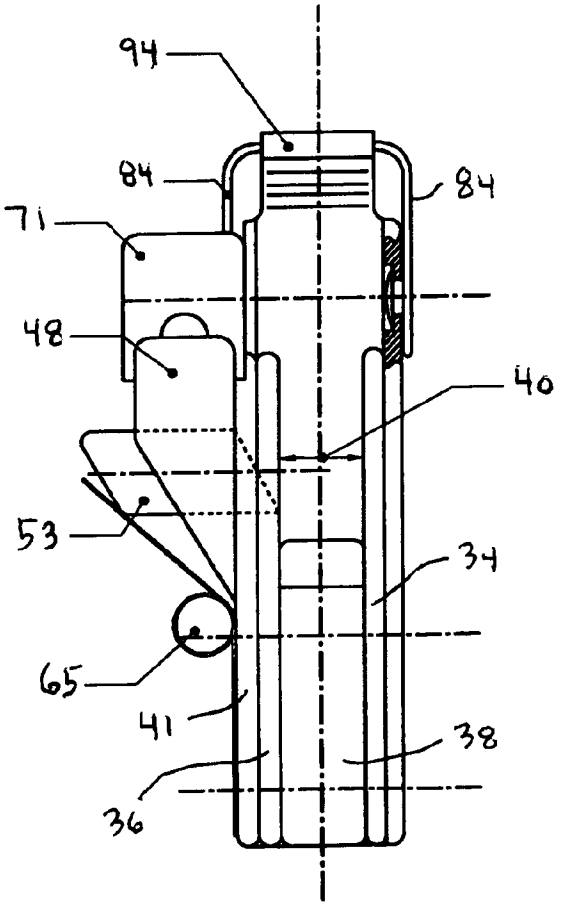
FIG. 22 is a schematic rear elevation view showing the primary handgun locking mechanism in the unlocked position.
Figure 21:
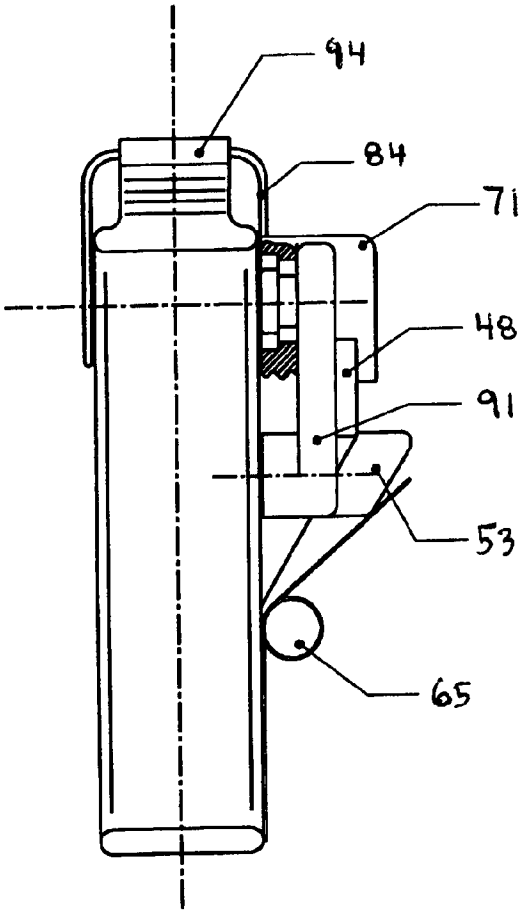
FIG. 21 is a schematic front elevation view showing the primary handgun locking mechanism in the unlocked position.

FIG. 27 is a outside view of the assembled over-molded holster illustrating the side surface of the over-molded holster body 102. FIG. 19 is a front view of the over-molded holster body. FIG. 20 is a rear view of the over molded holster body. FIG. 28 is a fragmentary transverse cross-sectional view of the over-molded holster body taken along section line G-G of FIG. 27. In these figures, the thermoplastic rubber over-mold is generally indicated by numeral 112. Generally, the entire exterior surface of the holster body is over-molded although on some designs some insert surfaces will be exposed.

Reference is now made to FIG. 28. This figure shows the threaded screw nuts 113 by which the holster body is attached together with a screw or screws generally indicated at 118 though spacer elements generally indicated at 38 completing a holster assembly that completely surrounds the handgun. The threaded screw nuts 113 could comprise metallic or plastic molded components.

It will be understood that distortion considerations due to shrinkage, warpage, outside forces and the like are unique with respect to each over-molded holster. The inserts 104 and 105 are first molded at which point minimal shrinkage or warpage may occur and thereafter the insert components become stabilized.

Next, the over-molding places a new thermoplastic material over the already stabilized inserts creating stresses not found in single stage molded parts, When the over-mold material is applied to the inserts with the appropriate heat and pressure, and then allowed to cool and stabilize, shrinkage of the thermoplastic rubber will tend to warp certain areas of the holster body. The insert elements must be designed to minimize this warpage and to minimize the disturbance of the flow of the thermoplastic elastomer. At the same time, the flow path of the elastomer in the mold must be carefully designed to provide the most efficient elastomer-to-insert bonding.

Insert sections 104 and 105 are also designed to provide a mechanical bond, wherever possible, between the thermoplastic rubber over mold 112 and the insert. In areas where delamination would be most likely to occur, such as at thin fleeting edges of the insert, the insert is configured to cause the thermoplastic rubber to hook thereabout, forming a permanent melt seal. Such permanent melt seals are indicated generally at 120 in FIG. 28.

It is within the scope of the invention to provide selected portions of the surface of the over-molded thermoplastic elastomer with a appearance-enhancing texture. The texture may be of any appropriate and well known type as shown generally at 120 in FIG. 27. It will be understood that textured areas may be applied to the entire holster or selectively as desired or not at all. For marketing or identification purposes some holsters may also be molded with logos or Police Dept. insignia as shown by example 122 of FIG. 27.

Modifications may be made in the invention without departing from the spirit of it. For example, the teachings of the present invention are also applicable to holsters without a safety strap.

What is claimed is:

1. A handgun holster comprising:

a body defining a tubular passage for receiving an elongated handgun portion including a barrel;

the body defining a trigger guard space adjacent to the passage for receiving the trigger guard of the handgun;

a trigger guard retention element connected to the body;

the retention element being [slidably operable] *movable* with respect to the body between a retention position in which it projects into the trigger guard space and a [retracted] *released* position in which it is retracted from the trigger guard space, such that [a] *the* handgun received in the holster is retained against extraction forces when the [latch] *retention* element is in the retention position, and [a] *the* handgun received in the [hoister] *holster* is removable from the holster when the retention element is in the released position;

a release actuator connected to the body;

the release actuator being movable with respect to the body between an actuated position and a retracted position;

the release actuator being mechanically engaged with the retention element and operable to move the retention element to the [retracted] *released* position when the release actuator is moved to the actuated position;

the release actuator being operable to secure the retention element in the retention position when the release actuator is in the retracted position; and wherein the release actuator has a wedge portion [received between an end] *that can mechanically engage a* portion of the retention element [and a surface portion of the body,] such that moving the release actuator to the actuated position advances the wedge portion to [drive the end portion of the release actuator away from the surface portion of the body] *engage the retention element, causing the retention element to move to the release position*.

2. A handgun holster comprising:

a body defining a tubular passage for receiving an elongated handgun portion including a barrel;

the body defining a trigger guard space adjacent to the passage for receiving the trigger guard of the handgun;

a trigger guard retention element connected to the body;

the retention element being [slidably operable] *movable* with respect to the body between a retention position in which it projects into the trigger guard space and a [retracted] *released* position in which it is retracted from the trigger guard space, such that [a] *the* handgun received in the holster is retained against extraction forces when the [latch] *retention* element is in the retention position, and [a] *the* handgun received in the holster is removable from the holster when the retention element is in the released position;

a release actuator connected to the body;

the release actuator being movable with respect to the body between an actuated position and a retracted position;

the release actuator being mechanically engaged with the retention element and operable to move the retention element to the [retracted] *released* position when the release actuator is moved to the actuated position;

the release actuator being operable to secure the retention element in the retention position when the release actuator is in the retracted position; and a safety strap element connected to the body and movable between a closed position in which a selected portion of the safety strap is positioned over an upper end of the passage to cover a rear end portion of [a] *the* handgun received in the holster, and an open position in which the selected portion is positioned away from the upper end of the passage, such that removal of [a] *the* handgun in the holster is not obstructed by the selected portion, and wherein the safety strap element is mechanically engaged to the release actuators to secure the release actuator in the retracted position when the safety strap element is in the closed position, and to permit movement of the release actuator to the actuated position when the safety strap element is in the open position.

* * * * *